United States Patent
Myers et al.

(10) Patent No.: US 9,696,721 B1
(45) Date of Patent: Jul. 4, 2017

(54) INDUCTIVE LOOP DETECTION SYSTEMS AND METHODS

(71) Applicant: Ford Global Technologies, LLC, Dearborn, MI (US)

(72) Inventors: Scott Vincent Myers, Camarillo, CA (US); Alexandru Mihai Gurghian, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/076,245

(22) Filed: Mar. 21, 2016

(51) Int. Cl.
*G05D 1/02* (2006.01)
*G08G 1/07* (2006.01)

(52) U.S. Cl.
CPC ......... *G05D 1/0212* (2013.01); *G05D 1/0231* (2013.01); *G08G 1/07* (2013.01)

(58) Field of Classification Search
CPC ....... G05D 1/0212; G05D 1/0231; G08G 1/07
See application file for complete search history.

(56) References Cited

U.S. PATENT DOCUMENTS

| 7,436,431 B2 | 10/2008 | Adachi |
| 8,284,995 B2 | 10/2012 | Diaz |
| 2016/0282127 A1* | 9/2016 | Goto ....................... G01S 19/42 |

FOREIGN PATENT DOCUMENTS

| JP | 2008074139 A | 4/2008 |
| JP | 2014202560 A | 10/2014 |
| KR | 100787747 B1 | 12/2007 |

* cited by examiner

*Primary Examiner* — Michael D Lang
(74) *Attorney, Agent, or Firm* — David R. Stevens; Stevens Law Group (57) ABSTRACT

Example inductive loop detection systems and methods are described. In one implementation, a method receives image data from a camera of a vehicle and determines a geographic position of the vehicle. Based on the image data and the geographic position of the vehicle, the method determines a location of an inductive loop in a roadway proximate the vehicle. The data associated with the location of the inductive loop is stored in a storage device within the vehicle.

14 Claims, 7 Drawing Sheets

INDUCTIVE LOOP DETECTION SYSTEMS AND METHODS

TECHNICAL FIELD

The present disclosure relates to vehicular systems and, more particularly, to systems and methods that detect the presence of one or more inductive loops in a roadway.

BACKGROUND

Automobiles and other vehicles provide a significant portion of transportation for commercial, government, and private entities. Many vehicle roadways include inductive loop systems that, for example, measure traffic flow and sense vehicle positions on the roadway, such as sensing a vehicle waiting to turn in a left turn lane or waiting at an entrance to a bridge or highway entrance ramp. To ensure accurate sensing by the inductive loop system, it is necessary that vehicles are positioned appropriately when driving over or near the inductive loops. Additionally, to support the functionality of driver assistance systems and/or autonomous driving systems, it is important to detect the inductive loops so the driver assistance systems and autonomous driving systems can properly position the vehicle to be sensed by the inductive loop systems.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The disclosure relates generally to methods, systems, and apparatuses for automated or assisted driving and, more particularly, relates to identification and navigation with respect to inductive loops in a roadway, parking lot or other surface. Inductive loops (also referred to as "induction loops") are used to detect vehicles passing over or arriving at a particular point on a roadway or other surface. For example, inductive loops are used to detect vehicles approaching an intersection, entering a left-turn lane, and entering a freeway entrance ramp. Additionally, inductive loops are used to monitor traffic flow and traffic density by counting the number of vehicles that drive over an inductive loop during a particular time period. This traffic flow and traffic density information is useful in metering the flow of new traffic onto a roadway and diverting traffic to different roadways when traffic density exceeds a particular level.

An inductive loop is an electrically conducting loop installed in the pavement or other driving surface. A data collection system (or other device) transmits energy into the conducting loop. When a vehicle passes over the inductive loop, or stops over the inductive loop, the vehicle causes a decrease in the inductance, which is sensed by the data collection system. In some situations, a vehicle must be properly positioned with respect to the inductive loop to "activate" the loop such that the data collection system senses the vehicle. For example, an inductive loop intended to detect vehicles waiting at a traffic signal requires a vehicle to be positioned at least partially over the inductive loop. If the vehicle is too far away from the inductive loop (e.g., the vehicle has not driven close enough to the traffic signal), the vehicle fails to activate the inductive loop and the existence of the waiting vehicle is never detected by the data collection system. Thus, it is important for autonomous and driver-assisted vehicles to know the location of inductive loops so the vehicle can be navigated to ensure activation of the appropriate inductive loops.

The present disclosure describes systems, methods, and devices for detecting inductive loops in a roadway or other surface. According to one embodiment, a method receives image data from at least one camera of a vehicle. The method also determines a geographic position of the vehicle. Based on the image data and the geographic position of the vehicle, the method determines a location of an inductive loop in a roadway. The location of the inductive loop is stored in a storage device within the vehicle. The location of the inductive loop may also be communicated to a central storage system that is accessible by multiple other vehicles.

Figure 1:
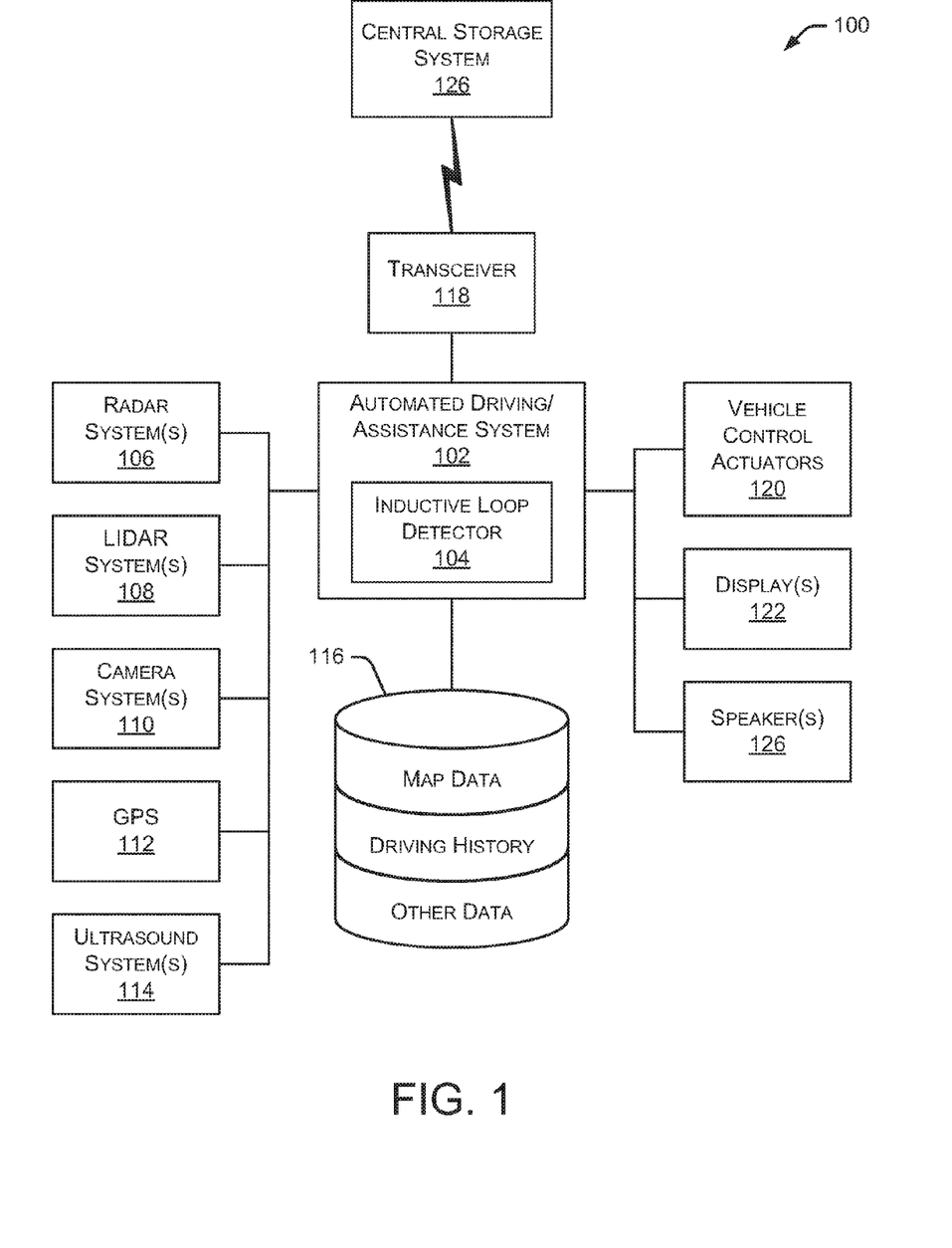
FIG. 1 is a block diagram illustrating an embodiment of a vehicle control system that includes an automated driving/assistance system.

FIG. 1 is a block diagram illustrating an embodiment of a vehicle control system 100 may be used to detect inductive loops in a roadway. An automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may include an inductive loop detector 104 that uses a neural network, or other model or algorithm, to determine that an inductive loop is present in a roadway and may also determine the location of the inductive loop. In one embodiment, the automated driving/assistance system 102 may determine a driving maneuver or driving path to ensure that the vehicle activates the inductive loop as the vehicle drives over the inductive loop.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultra sound systems 114. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system. In the embodiment of FIG. 1, transceiver 118 may communicate data to and from a central storage system 126, such as data associated with inductive loops and other roadway-related information.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement an algorithm or use a model, such as a deep neural network, to process the sensor data and identify a presence and location of an inductive loop.

Figure 2A:
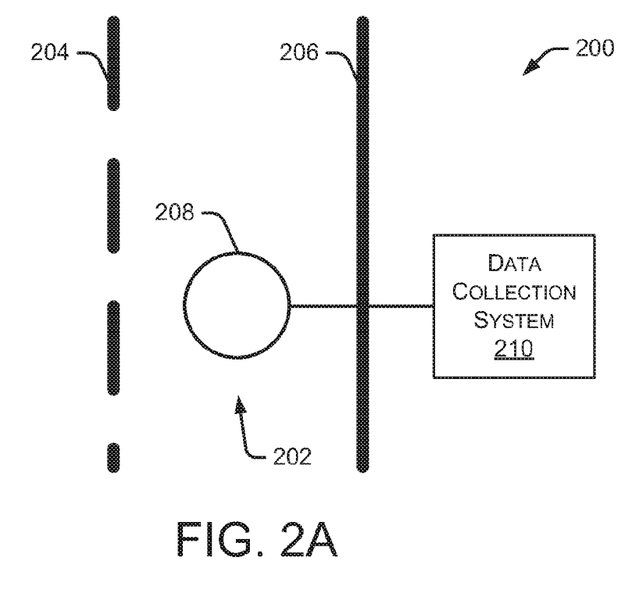
FIGS. 2A and 2B illustrate example inductive loop systems installed in a roadway.

FIGS. 2A and 2B illustrate example inductive loop systems installed in a roadway. FIG. 2A illustrates a roadway 200 that includes a lane 202, which is bounded by lane markings 204 and 206. In this example, lane marking 204 separates traffic in an oncoming lane and lane marking 206 identifies the edge of roadway 200. An inductive loop 208 is positioned in the middle of lane 202 such that vehicles driving in lane 202 activate inductive loop 208 as they drive over the inductive loop. A data collection system 210 is coupled to inductive loop 208 and senses vehicles that drive over inductive loop 208 or stop such that the vehicle is located over at least a portion of inductive loop 208. In some embodiments, data collection system 210 counts the number of vehicles that drive over inductive loop 208 during a particular time period. In other embodiments, data collection system 210 senses when a vehicle stops over at least a portion of inductive loop 208 and, in response, activates a traffic signal, gate, metering light, and the like.

Figure 2B:
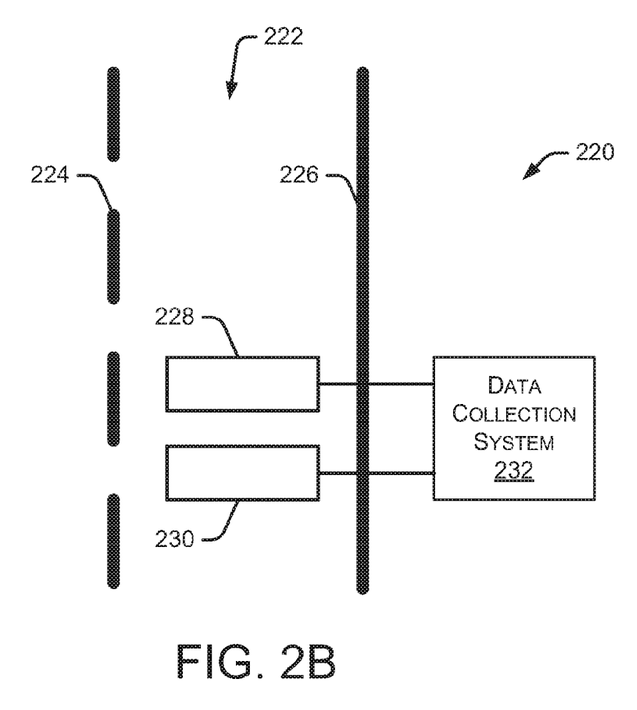

FIG. 2B illustrates a roadway 220 that includes a lane 222, which is bounded by lane markings 224 and 226. In this example, lane marking 224 separates traffic in an oncoming lane and lane marking 226 identifies the edge of roadway 220. Two inductive loops 228 and 230 are positioned in the middle of lane 222 such that vehicles driving in lane 222 activate inductive loops 228 and 230 as the vehicle drives over the inductive loop. A data collection system 232 is coupled to inductive loops 228 and 230. Data collection system 232 senses vehicles that drive over inductive loops 228 and 230, or stop such that the vehicle is located over at least a portion of inductive loop 228 or 230.

Although FIGS. 2A and 2B illustrate particular inductive loop shapes and positions, other embodiments may include inductive loops having any shape and positioned in any part of a road surface. For example, inductive loops may have a shape that is round, oval, square, rectangular or a pentagon, hexagon, octagon, and the like. Additionally, the shape of an inductive loop may be irregular. In some embodiments, an inductive loop is positioned in multiple lanes of a roadway. Further, any number of inductive loops may be positioned in close succession. As shown in FIG. 2B, two inductive loops 228 and 230 are positioned close to one another. In other embodiments, any number of inductive loops can be positioned near each other.

Figure 3:
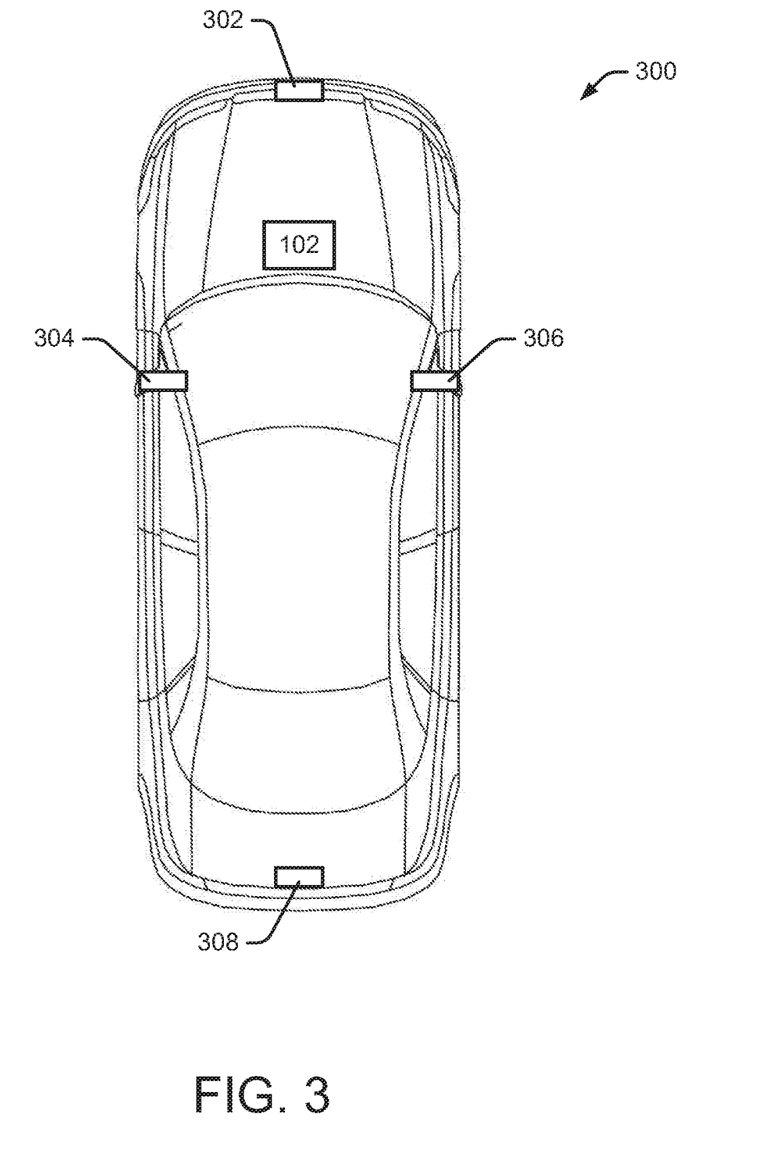
FIG. 3 is a top view diagram illustrating an embodiment of a vehicle with multiple cameras.

FIG. 3 is a top view diagram illustrating an embodiment of a vehicle 300 with multiple cameras. In the embodiment of FIG. 3, vehicle 300 has four cameras 302, 304, 306, and 308. As shown, camera 302 is a forward-facing camera that captures images of the roadway ahead of vehicle 300. Cameras 304 and 306 are side-facing cameras that captures images to the left and right of vehicle 300. For example, camera 304 may capture images of the adjacent lane to the left of vehicle 300 and camera 306 may capture images of the adjacent lane to the right of vehicle 300. In a particular embodiment, cameras 304 and 306 are mounted in (or near) the side-view mirrors of vehicle 300. Camera 308 is a rear-facing camera that captures images of the roadway behind vehicle 300. Camera 308 may also be referred to as a backup camera. Cameras 302, 304, 306, and 308 are coupled to automated driving/assistance system 102, as discussed herein.

Although four cameras 302-308 are shown in FIG. 3, a particular vehicle may have any number of cameras positioned at any location on the vehicle. Cameras 302-308 are capable of capturing images of a roadway on which vehicle 300 is driving. These captured images can be analyzed to identify inductive loops positioned in the roadway, as discussed herein.

In some embodiments, one or more of cameras 302-308 are continuously capturing images of the nearby roadway while vehicle 300 is moving. These captured images are analyzed to identify inductive loops in the roadway and record the geographic location of the inductive loops based on GPS data. As discussed herein, this recorded information regarding the inductive loops is communicated to central storage system 126 for use by other vehicles. In other embodiments, the captured image data and GPS data are communicated to central storage system 126 and a computing system (e.g., a server) associated with central storage system 126 analyzes the captured images to identify inductive loops in the captured image data. Over time, central storage system 126 develops a database of inductive loop information for roads throughout a region or an entire country. This inductive loop information is used by multiple vehicles to identify approaching inductive loops and locate inductive loops along a vehicle's planned route. Thus, multiple vehicles contribute to the database of inductive loop information and receive the benefit of inductive loop information generated by other vehicles.

Figure 4:
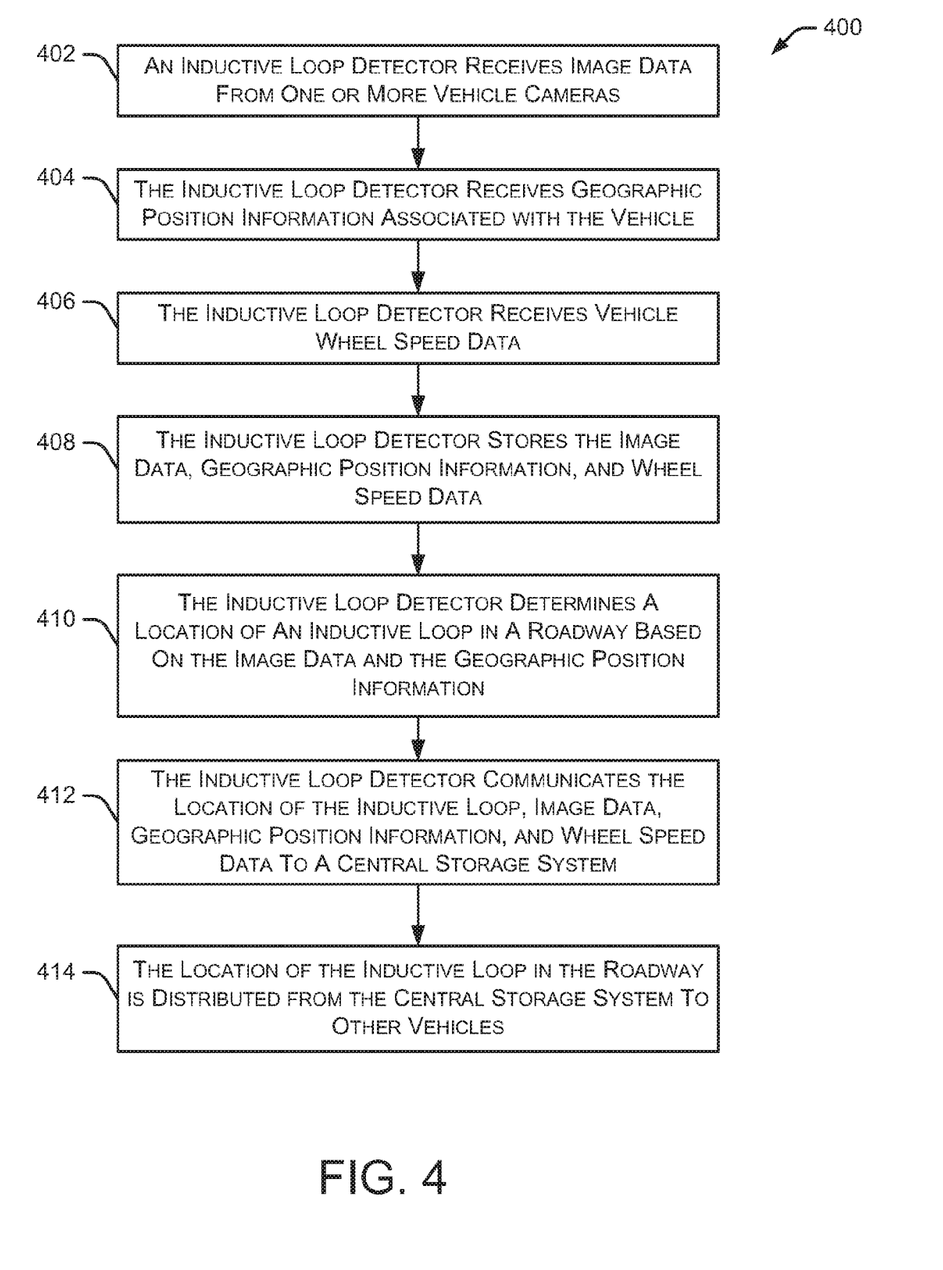
FIG. 4 is a flow diagram illustrating an embodiment of a method for identifying and distributing information associated with the location of inductive loops.

FIG. 4 is a flow diagram illustrating an embodiment of a method 400 for identifying and distributing information associated with the location of inductive loops. Initially, an inductive loop detector (e.g., inductive loop detector 104 shown in FIG. 1) receives image data from one or more vehicle cameras at 402. The inductive loop detector also receives geographic position information associated with the vehicle at 404. For example, the geographic position information provided by GPS 112 may be determined and associated with the image data at the time the image data is captured. The inductive loop detector also receives vehicle wheel speed data at 406. The vehicle wheel speed data may be available from the vehicle's CAN (Controller Area Network) bus or directly from a wheel speed sensor on the vehicle.

The inductive loop detector stores the image data, geographic position information, and wheel speed data at 408. For example, the data and information may be stored on a storage device within the vehicle and/or stored on central storage system 126. The inductive loop detector also determines a location of an inductive loop in a roadway based on the image data and the geographic position information at 410. For example, a camera may capture image data of the roadway and a GPS simultaneously determines a location of the vehicle. In some embodiments, the orientation of the camera is known, such that the area of the roadway captured in the image data is a particular distance and angle from the vehicle. For example, a particular camera may be oriented such that is captures an area approximately 5-8 feet behind a vehicle.

Method 400 continues as inductive loop detector communicates the location of the inductive loop, image data, geographic position information, and wheel speed data to a central storage system at 412. The location of the inductive loop in the roadway is distributed from the central storage system to other vehicles at 414, thereby allowing the other vehicles to know the location of the inductive loops and drive such that the vehicle properly activates the desired inductive loops.

In some embodiments, the described systems and methods also determine a category associated with a particular roadway, such as a highway, an entrance ramp, a bridge, a left-turn lane, a surface street, and an intersection. This category information is tagged (or otherwise associated) with the image data and helps identify a "type" of inductive loop. For example, an inductive loop in a driving lane of a freeway is likely used to monitor highway traffic flow or traffic density. An inductive loop on an entrance ramp is likely used to meter traffic (i.e., limit the rate at which vehicles access the entrance ramp). An inductive loop in a left-turn lane, or near an intersection with a traffic signal, is likely used to notify the traffic signal that a vehicle is waiting to turn or continue through an intersection.

In some embodiments, the described systems and methods use deep neural networks that learn to identify inductive loops within image data captured by multiple vehicles. For example, deep neural networks may be trained using multiple images (e.g., example inductive loop images) representing different types of inductive loops. As the deep neural networks are trained and gather more data, they become more accurate at identifying inductive loops within the captured image data. In particular implementations, deep neural networks are trained by a human operator with knowledge of the image content. The human operator can identify the location of any inductive loop in each image. The image data used during the training contains inductive loops of different shapes, sizes, orientations, and positions within lanes of a roadway.

After the deep neural networks are trained, they are implemented in a particular vehicle and/or a separate computing system (e.g., a server) to identify inductive loops in an image. In some embodiments, an inductive loop recognition algorithm first identifies lanes in an image of a roadway using, for example, lane detection algorithms, digital maps, and drive history information. Based on the identified lane information, the algorithm defines a region of interest (e.g. the area between the lines defining the lane) where inductive loops are likely to be located. This region of interest is provided to a deep neural network that is specifically trained to identify inductive loops. The deep neural network then provides an indication of whether an inductive loop is located within the region of interest. If an inductive loop is detected, the deep neural network provides position information (i.e., the specific location of the inductive loop within the region of interest).

Many of the example implementations discussed herein use images captured by one or more vehicle cameras to detect inductive loops in a roadway. In alternate embodiments, other vehicle sensors can be used to detect inductive loops, such as Radar, LIDAR (Light Detection and Ranging), Ultrasound, and the like. In some embodiments, one or more vehicle sensors and/or vehicle camera may be used in combination to detect inductive loops. For example, a vehicle camera can be used in combination with a vehicle's LIDAR system to improve the accuracy of detecting inductive loops in a roadway and determining the specific location of the inductive loops in the roadway.

Figure 5:
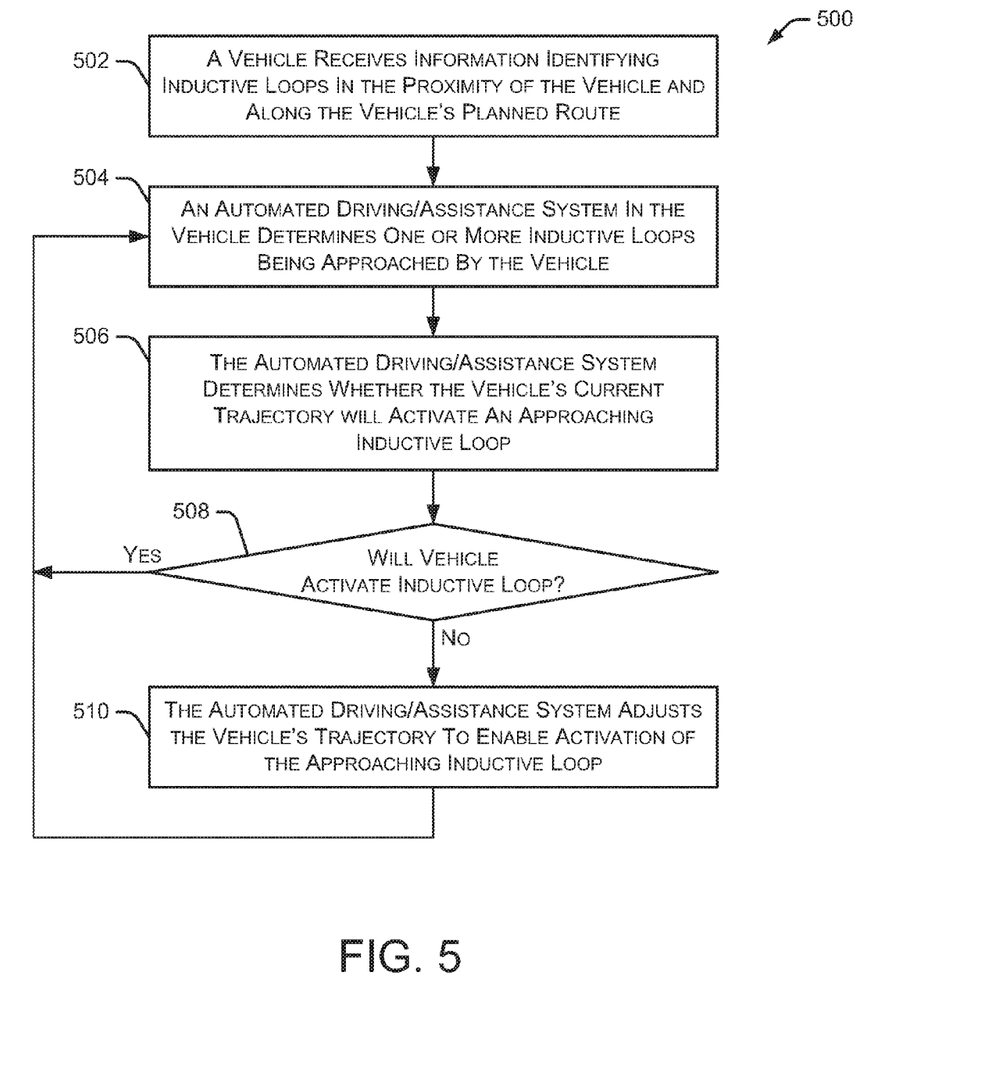
FIG. 5 is a flow diagram illustrating an embodiment of a method for adjusting a vehicle's trajectory to activate an approaching inductive loop.

FIG. 5 is a flow diagram illustrating an embodiment of a method 500 for adjusting a vehicle's trajectory to activate an approaching inductive loop. Initially, a vehicle receives information identifying inductive loops in the proximity of the vehicle and along the vehicle's planned route at 502. In some embodiments, the vehicle receives the inductive loop information, which includes the geographic location of the inductive loop, from central storage system 126. An automated driving/assistance system in the vehicle determines one or more inductive loops being approached by the vehicle at 504. For example, based on the vehicle's current location and trajectory (or planned route), the automated driving/assistance system can identify upcoming inductive loops of interest to the vehicle based on its planned route.

The automated driving/assistance system determines whether the vehicle's current trajectory will activate an approaching inductive loop at 506. If the vehicle will activate the inductive loop at 508, the method returns to 504, where the automated driving/assistance system continues to identify approaching inductive loops. If the vehicle will not activate the inductive loop at 508, the automated driving/assistance system adjusts the vehicle's trajectory to enable activation of the approaching inductive loop at 510. For example, if the vehicle is approaching a traffic signal, the method 500 ensures that the vehicle properly activates an inductive loop responsible for sensing the vehicle and changing the traffic signal to allow the vehicle to proceed through an intersection.

Figure 6:
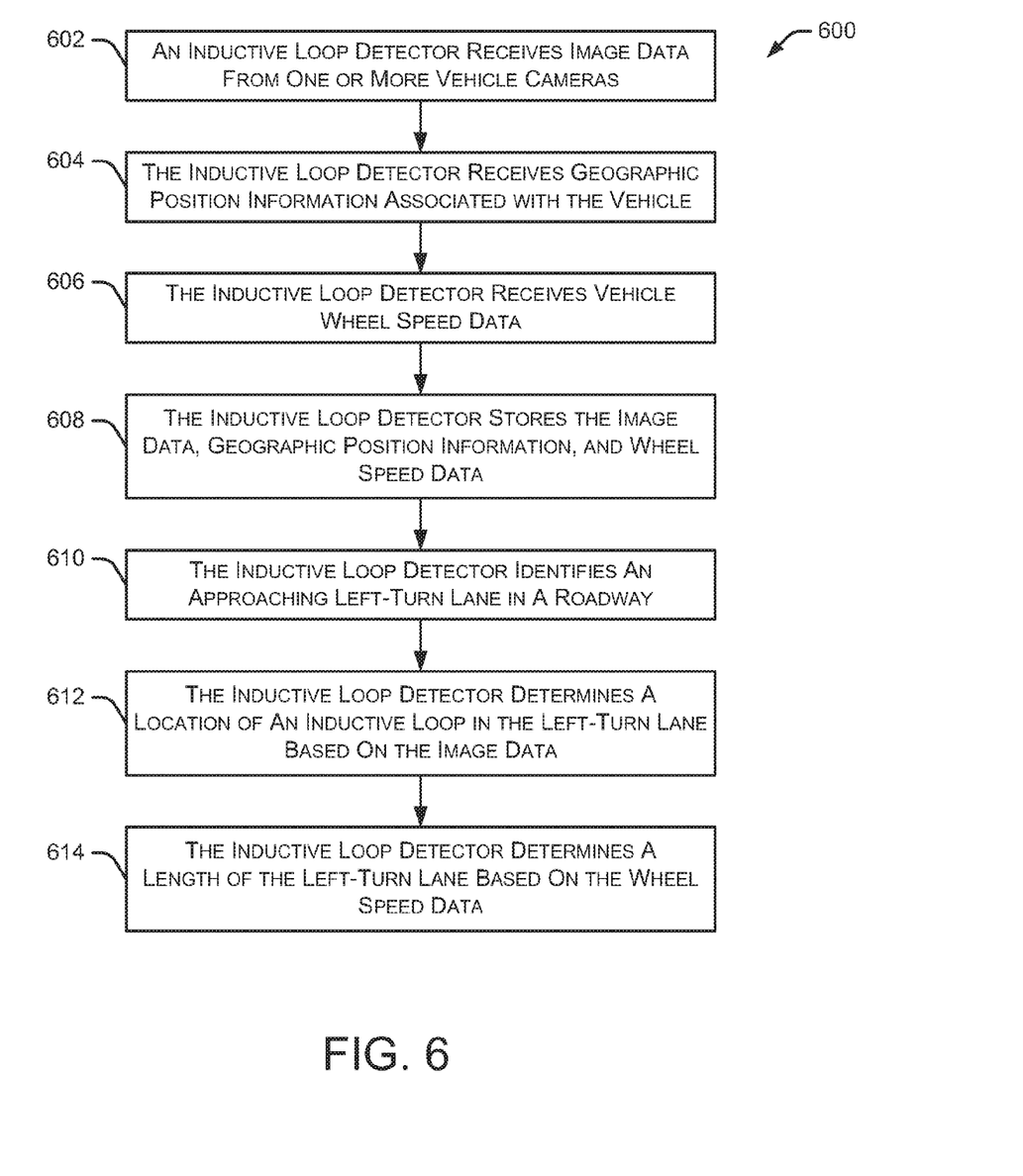
FIG. 6 is a flow diagram illustrating an embodiment of a method for identifying turn lane information and the location of an inductive loop within the turn lane.

FIG. 6 is a flow diagram illustrating an embodiment of a method 600 for identifying turn lane information and the location of an inductive loop within the turn lane. Initially, an inductive loop detector receives image data from one or more vehicle cameras at 602. The inductive loop detector also receives geographic position information associated with the vehicle at 604. Additionally, the inductive loop detector receives vehicle wheel speed data at 606. The image data, geographic position information, and wheel speed data is stored by the inductive loop detector at 608.

Method 600 continues as the inductive loop detector identifies an approaching left-turn lane in a roadway at 610. Although the example of FIG. 6 discusses a left-turn lane, similar methods may be used with respect to right-turn lanes, metering lanes, bridge access lanes, traffic signals at intersections, and the like. Regarding the identified left-turn lane, the inductive loop detector determines a location of an inductive loop in the left-turn lane based on the image data at 612. Further, the inductive loop detector determines a length of the left-turn lane based on the wheel speed data at 614.

Although not shown in FIG. 6, the inductive loop detector may communicate the location of the inductive loop, length of the left-turn lane, and other data to a central storage system. The location of the inductive loop and the length of the left-turn lane is then distributed from the central storage system to other vehicles, thereby allowing the other vehicles to know the location of the inductive loops and the size of the left-turn lane such that the vehicle properly activates the desired inductive loops.

Figure 7:
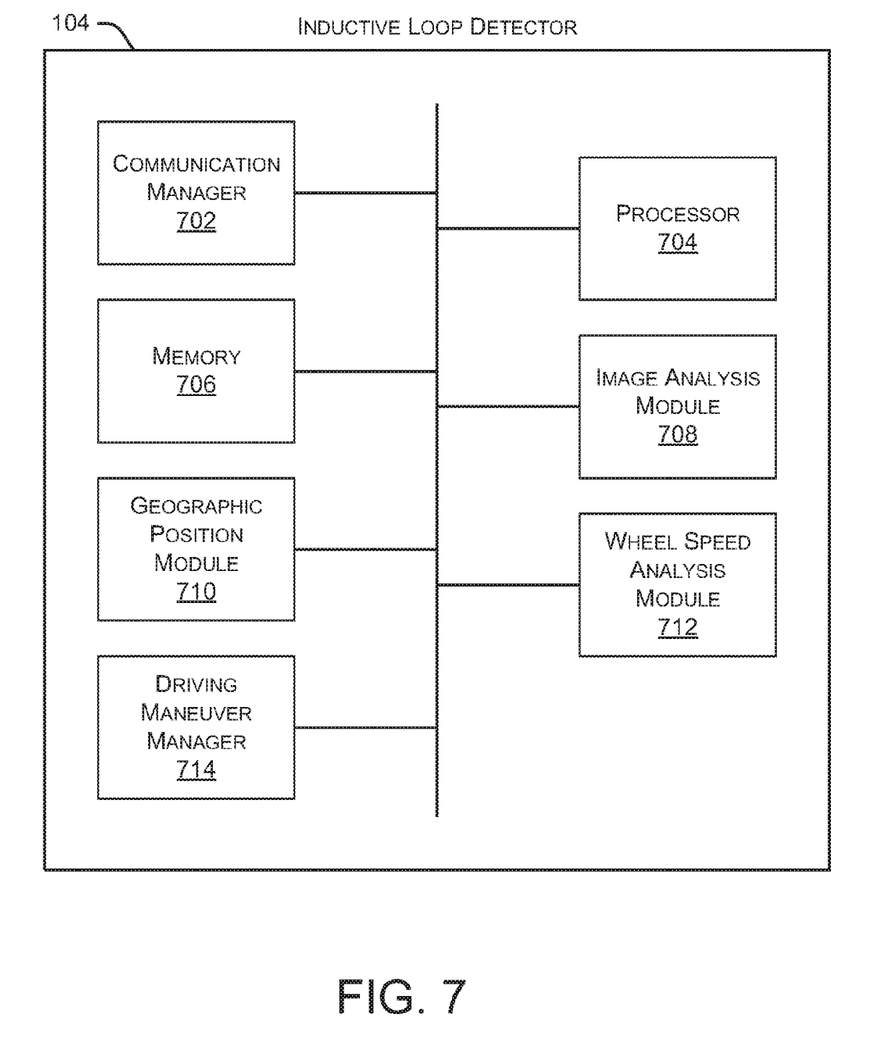
FIG. 7 is a block diagram illustrating depicting an embodiment of an inductive loop detector.

FIG. 7 is a block diagram illustrating depicting an embodiment of inductive loop detector 104. As shown in FIG. 7, inductive loop detector 104 includes a communication manager 702, a processor 704, and a memory 706. Communication manager 702 allows inductive loop detector 104 to communicate with other systems, such as automated driving/assistance system 102. Processor 704 executes various instructions to implement the functionality provided by inductive loop detector 104. Memory 706 stores these instructions as well as other data used by processor 704 and other modules contained in inductive loop detector 104.

Additionally, inductive loop detector 104 includes an image analysis module 708 that identifies inductive loops, lane boundaries, and other information from images captured by one or more cameras attached to the vehicle. A geographic position module 710 determines a geographic location of a vehicle when an image is captured by a camera, and associates the geographic location with the captured image. A wheel speed analysis module 712 identifies a vehicle's wheel speed and, based on the wheel speed and the image data, determines a size of a turn lane or other portion of a roadway. A driving maneuver manager 714 determines what, if any, changes to the trajectory of a vehicle are necessary to ensure that the vehicle activates one or more inductive loops.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   traversing, by a first vehicle, a section of a road;
   continuously capturing, by at least one camera carried on-board the first vehicle during the traversing, images of the road;
   collecting, by a computer system carried on-board the first vehicle, global location information identifying a plurality of geographic locations of the first vehicle during the traversing;
   searching, by the computer system, the images for one or more visual indicators of one or more inductive loops embedded in the road;
   identifying, by the computer system within at least one image of the images, at least one visual indicator of a first inductive loop embedded in the road;
   using, by the computer system, relative location information identifying a relative location of the first inductive loop with respect to the first vehicle when the at least one image was captured and the global location information to determine a global location of the first inductive loop; and
   storing, by the computer system, the global location of the first inductive loop.

2. The method of claim 1, wherein the relative location information takes into account an orientation of the at least one camera.

3. The method of claim 1, further comprising communicating, by the computer system, the global location of the first inductive loop to a central storage system accessible by a plurality of vehicles.

4. The method of claim 1, wherein the global location of the first inductive loop identifies a lateral location of the first inductive loop within a lane of the road.

5. The method of claim 1, wherein the lane is a left turn lane.

6. The method of claim 1, further comprising:
   communicating, by the computer system, the global location of the first inductive loop to a central storage system;
   receiving, by a driving assistance system of a second vehicle from the central storage system, information identifying the global location of the first inductive loop;
   approaching, by the second vehicle, the global location of the first inductive loop;
   determining, by the driving assistance system, that a current trajectory of the second vehicle will not activate the first inductive loop; and
   responsive to determining that the current trajectory of the second vehicle will not activate the first inductive loop, adjusting, by the driving assistance system, the second vehicle's trajectory to enable activation of the first inductive loop.

7. The method of claim 6, further comprising receiving, by the driving assistance system from the central storage system, information identifying multiple inductive loops along a planned route of the second vehicle.

8. The method of claim 6, further comprising stopping the second vehicle at a location that activates the first inductive loop.

9. A system comprising:
   a first vehicle traversing a section of a road;
   at least one camera carried on-board the first vehicle and capturing, during the traversing, images of the road; and
   a first computer system carried on-board the first vehicle and comprising at least one first processor and first memory operable connected to the at least one first processor, the first memory storing first software programmed to
   collect global location information identifying a plurality of geographic locations of the first vehicle during the traversing,
   search the images for one or more visual indicators of one or more inductive loops embedded in the road,
   identify within at least one image of the images at least one visual indicator of a first inductive loop embedded in the road,
   use relative location information identifying a relative location of the first inductive loop with respect to the first vehicle when the at least one image was captured and the global location information to determine a global location of the first inductive loop, and
   store the global location of the first inductive loop.

10. The system of claim 9, wherein the first software is further programmed to communicate the global location of the first inductive loop to a central storage system off-board the first vehicle.

11. The system of claim 10, further comprising:
   a second vehicle traversing the section of the road sometime after the first vehicle traversed the section of the road;
   a second computer system carried on-board the second vehicle and comprising at least one second processor and second memory operable connected to the at least one second processor, the second memory storing second software programmed to receive information identifying the global location of the first inductive loop.

12. The system of claim 11, wherein the second software is further programmed to detect that the second vehicle is approaching the first inductive loop.

13. The system of claim 12, wherein the second software is further programmed to determine that a current trajectory of the second vehicle will not activate the first inductive loop.

14. The system of claim 13, wherein the second software is further programmed to respond to determining that the current trajectory of the second vehicle will not activate the first inductive loop by adjusting the second vehicle's trajectory to enable activation of the first inductive loop.

* * * * *